(12) United States Patent
Loeffler et al.

(10) Patent No.: US 12,377,840 B2
(45) Date of Patent: Aug. 5, 2025

(54) METHOD FOR GENERATING A LATERAL OFFSET TRAJECTORY

(71) Applicant: Robert Bosch GmbH, Stuttgart (DE)

(72) Inventors: Christian Loeffler, Untereisesheim (DE); Steffen Joos, Walheim (DE); Timm Florian Gloger, Bamberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

(21) Appl. No.: 17/917,206

(22) PCT Filed: Aug. 3, 2021

(86) PCT No.: PCT/EP2021/071601
§ 371 (c)(1),
(2) Date: Oct. 5, 2022

(87) PCT Pub. No.: WO2022/078648
PCT Pub. Date: Apr. 21, 2022

(65) Prior Publication Data
US 2023/0159024 A1     May 25, 2023

(30) Foreign Application Priority Data
Oct. 15, 2020    (DE) ..................... 10 2020 213 013.2

(51) Int. Cl.
| | |
|---|---|
| *B60W 30/095* | (2012.01) |
| *B60W 10/18* | (2012.01) |
| *B60W 10/20* | (2006.01) |
| *B60W 40/114* | (2012.01) |
| *B62D 15/02* | (2006.01) |
| *B60W 50/00* | (2006.01) |

(52) U.S. Cl.
CPC .......... *B60W 30/095* (2013.01); *B60W 10/18* (2013.01); *B60W 10/20* (2013.01);
(Continued)

(58) Field of Classification Search
CPC .... B60W 30/08; B60W 30/09; B60W 30/095; B60W 30/0953; B60W 10/20;
(Continued)

(56) References Cited

U.S. PATENT DOCUMENTS

2018/0284775 A1    10/2018   Brettschneider et al.

FOREIGN PATENT DOCUMENTS

| | | | | |
|---|---|---|---|---|
| DE | 102009020648 A1 | * | 12/2009 | ............. G05D 1/027 |
| JP | 2008143269 A | | 6/2008 | |

OTHER PUBLICATIONS

Joos, et al., "Kinematic real-time trajectory planning with state and input constraints for the example of highly automated driving", Oct. 9, 2019, 23rd International Conference on System Theory, Control and Computing (ICSTCC 2019), pp. 779-784 (Year: 2019).*

(Continued)

*Primary Examiner* — Spencer D Patton
(74) *Attorney, Agent, or Firm* — NORTON ROSE FULBRIGHT US LLP

(57) ABSTRACT

A method for generating a lateral offset trajectory for an at least partially automated mobile platform. The method includes: providing a target lateral offset; inverting a provided dynamic model of the mobile platform; providing at least one limit of a system variable of the dynamic model for determining the lateral offset trajectory; determining a time sequence of lateral offset trajectory points for the inverted dynamic model with a state variable filter, based on the limit(s) of the system variable, and the target lateral offset as an input signal; and determining a time sequence of values of at least one manipulated variable for the mobile platform, using the inverted dynamic model and the time sequence of the lateral offset trajectory points as an input signal for the inverted dynamic model, to generate the lateral offset trajectory.

27 Claims, 5 Drawing Sheets

(52) U.S. Cl.
CPC ...... B60W 30/0953 (2013.01); B60W 40/114 (2013.01); B62D 15/0265 (2013.01); *B60W 2050/0033* (2013.01); *B60W 2520/125* (2013.01); *B60W 2520/14* (2013.01); *B60W 2520/20* (2013.01); *B60W 2710/182* (2013.01); *B60W 2710/207* (2013.01)

(58) Field of Classification Search
CPC ....... B60W 40/114; B60W 2050/0033; B60W 2050/0027; B60W 2520/125; B60W 2520/14; B60W 2520/20; B60W 2520/26; B60W 2710/207; B62D 15/0265; B60Y 2300/09
See application file for complete search history.

(56) References Cited

OTHER PUBLICATIONS

Joos, et al. "Online-trajectory planning for state- and input-constrained linear SISO systems using a switched state variable filter," Jul. 2017, IFAC-PapersOnLine, vol. 50, Issue I, pp. 2639-2644 (Year: 2017).*

Abel, et al., "Analytical extension of the effective axle characteristics concept for the development of a structured chassis design process," Apr. 2017, Vehicle System Dynamics (Year: 2017).*

Joos et al. "Constrained Online Trajectory Planning for Nonlinear Flat SISO Systems Using a Switched State Variable Filter", Automatica, 110 (2019) pp. 1-7.

Joos et al. "Online-trajectory Planning for State- and Input-constrained Linear SISO Systems Using a Switched State Variable Filter", IFAC PapersOnLine 50-1 (2017) pp. 2639-2644.

Joos et al. "Kinematic Real-time Trajectory Planning with State and Input Constraints for the Example of Highly Automated Driving", 23rd International Conference on System Theory, Control and Computing (ICSTCC) (2019) pp. 779-784.

Schwarzmann et al. "A Flatness-Based Approach to Internal Model Control", Proceedings of the 2006 American Control Conference (2006) pp. 5666-5671.

International Search Report for PCT/EP2021/071601, Issued Nov. 10, 2021.

* cited by examiner

METHOD FOR GENERATING A LATERAL OFFSET TRAJECTORY

BACKGROUND INFORMATION

Emergency evasion maneuvers for avoiding accidents in road traffic can generally only be triggered at a very late time, i.e. shortly before a potential collision, as a result of which high demands on the dynamics of the maneuver arise. On the one hand, in many situations, the objects involved can only be detected by sensors at a very late point in time, for example because a pedestrian steps into a lane from an obscured line of sight; on the other hand the sum of the sensor uncertainties and the uncertainties of the further processes of a detected situation is regularly very high, since, for example, abrupt changes in movement of a crossing pedestrian can be difficult to predict.

Complete utilization of the available dynamics, in particular of the vehicle dynamics, is therefore desirable.

SUMMARY

In the planning of the intervention design for the vehicle transverse dynamics of driver assistance functions, the corresponding vehicle trajectory is usually selected such that an optimal profile with respect to the comfort of the intervention results, wherein, for example, a transverse acceleration and/or transverse jerking limit is controlled. To comply with the controllability limit values, the trajectory is selected such that the global yaw rate maximum coincides with the yaw rate limit value of the controllability.

This results in a yaw rate profile which has a global maximum.

To ensure the controllability of the vehicle by manual interventions of the driver with automatically controlled interventions in the vehicle dynamics, which may potentially be prone to errors, limit values for dynamic interventions should be maintained which were determined in the context of experimental studies for various actuators and vehicles.

It has been shown that these limit values related to actuators can be transferred to system-independent limit values, for example a yaw rate, of the relevant vehicle in relation to vehicle transverse dynamics.

In developments of such driver assistance functions, system-specific actuator limit values are typically derived from a system-independent controllability limit value, such as a yaw rate.

These limit values of the actuators, which adjust corresponding manipulated variables and, if necessary, further necessary limitations of the system behavior which can be described by so-called state variables, are typically not taken into account directly in the trajectory planning, but rather only flow downstream into the functional implementation by a corresponding application of the trajectory planning. This increases the application efforts.

A direct consideration of the yaw rate limit values within a functional implementation may be problematic if an actuator-specific manipulated variable limit value must be derived from the yaw rate limit value. Due to differential or non-linear relationships, this can typically not take place without simplifications. However, such simplifications can lead to significant deviations between the vehicle dynamics assumed thereby in comparison with real vehicle dynamics. This, in turn, can result in the controllability limit values in the yaw rate profile of the maneuver being exceeded, which must then be prevented with increased subsequent application effort.

Developments of such driver assistance functions which enable a direct consideration of limits within the trajectory planning are typically based on optimization methods and are therefore generally able to be integrated, due to the high required computing power, only to a limited extent in control devices of mobile platforms for series production. As a result, in accordance with the related art, potential for avoiding accidents remains unused, since the maximum yaw rate or the yaw rate limit value is reached only at a single point in time within the course of the trajectory.

According to aspects of the present invention, a method for generating a lateral offset trajectory, a method for providing a control signal, a use of the method, a control device, a computer program product, and a machine-readable storage medium, are provided. Advantageous embodiments of the present invention are disclosed herein.

In this entire description of the present invention, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

According to an example embodiment of the present invention, a method for determining a lateral offset trajectory for an at least partially automated mobile platform is provided, having the following steps:

In one step, a target lateral offset is provided. In a further step, a provided dynamic model of the mobile platform is inverted. In a further step, at least one limit of a system variable of the dynamic model is provided for determining the lateral offset trajectory. In a further step, a time sequence of lateral offset trajectory points for the inverted dynamic model with a state variable filter, based on the at least one limit of the system variable, and the target lateral offset as an input signal, is determined, wherein each point of the time sequence of the lateral offset trajectory is determined analytically. In a further step, a time sequence of values of at least one manipulated variable for the mobile platform, using the inverted dynamic model and the time sequence of the lateral offset trajectory points as input signal for the inverted dynamic model, is determined in order to generate the lateral offset trajectory.

According to one aspect of the present invention, the state variable filter has unlimited desired dynamics.

In other words, in this method, the inverted dynamic model is used to determine the manipulated variable which then serves as an input signal for a real dynamic system, such as a mobile platform.

The lateral offset trajectory can be executed by the mobile platform on the basis of the time sequence of values of at least one manipulated variable.

The fact that each point of the time sequence of the lateral offset trajectory is analytically determined by means of the state variable filter is to be interpreted broadly in relation to the feature of the analytical determination and, in particular, to be differentiated from approximation methods and optimization methods. In particular, according to an example embodiment of the present invention, the analytical determination comprises at least a determination of an integral with a fixed step size during runtime and at any point in time.

The analytical determination thus comprises in particular no recursive determination of individual points in the sense of an optimization method. In particular, analytical determination comprises passing through an n-fold integrator chain, wherein n describes a system order that characterizes the dynamic model. This analytical determination of the points of the time sequence of the lateral offset trajectory can take place, for example, by means of a computer and a correspondingly configured computer program.

In particular, using the determined time sequence of values of at least one manipulated variable, a target specification for a further control loop for controlling the mobile platform, corresponding to a pilot control, for example by the specification of a steering angle or a steering angle rate, a lateral offset trajectory can be generated.

Based on a differential flat system for describing the dynamic model of the mobile platform and on a state variable filter, this method enables online trajectory planning with direct consideration of at least one system variable limit, wherein in particular manipulated variable limits and/or state variable limits can be taken into account directly in the online trajectory planning.

In this case, for the online trajectory planning, the state variable filter determines a time sequence of lateral offset trajectory points by the n-fold time differentiation of the target lateral offset into flat coordinates $w_z$. In addition, with this method, the provision of a time sequence of values of at least one manipulated variable can realize a flatness-based pilot control and/or regulation, i.e., at least one manipulated variable in the form of a sequence of values is provided with the method, by means of which manipulated variable the mobile platform can be controlled and/or regulated.

By using differential flat systems for describing the dynamic model and in particular the state variable filter, all system-theoretical variables can be parameterized, and the dynamic model of the mobile platform can thus be inverted in order to build up control and/or regulation for the mobile platform. This applies in particular for linear controllable dynamic models of the mobile platform, and in particular for nonlinear dynamic models of the mobile platform when they are differentially flat. In this case, linear controllable models are always differentially flat; in the nonlinear state the flatness must be shown separately.

Advantageously, a direct consideration of all existing state and manipulated variable limits of the dynamic model of the mobile platform as an integral component of an online trajectory planning is possible with this method, and/or a flatness-based pilot control for maximizing the functional use of automated evasion functions can be provided. As a result, a complete planning of an evasion or lateral offset trajectory can take place with optimal utilization of the controllability limit of a state variable, such as a yaw rate, and/or a manipulated variable, such as a steering angle rate.

In addition, further state and manipulated variable limits can be realized without the solution of an optimization problem being required for this purpose during the run time and the method thus being compatible with the computing power of series control devices which are configured to carry out the method.

In other words, the method yields the following:
- an optimization of a functional use of evasion functions with a correspondingly generated lateral offset trajectory by maximizing utilization of controllability limit values of state variables, such as a yaw rate, the mobile platform and/or manipulated variables, such as a steering angle rate.
- a complete model-based approach for directly and systematically taking into account state and manipulated variable limits without the need to numerically solve an optimum control problem during runtime.
- ensuring a feasibility of the calculated trajectories, since the existing state and manipulated variable limits are already taken into account during the generation of the lateral offset trajectory.
- no significant increase in the computing time or real-time capability, since the numerical online solution of an optimum control problem can be dispensed with, since the calculations are carried out by means of recursion-free algorithms.
- an online-generated trajectory which enables an adaptive behavior in relation to a necessary lateral offset, since, in the case of a change in the situation which has led to an adjustment of the evasion trajectory, the latter can be taken into account directly in the next calculation step with the method.
- an additional advantage, since the dynamic model used in the generation of the lateral offset trajectory can directly provide an actuator-specific pilot control component for implementing the evasion maneuver.

According to an example embodiment of the present invention, in the method, the dynamic model of the mobile platform can be described with a linear model which is described in a state space representation by the equations: 4.1 and 4.2:

$$\dot{\underline{x}} = A \cdot \underline{x} + \underline{b} \cdot u \qquad 4.1$$

$$y = \underline{c}^T \cdot \underline{x} \qquad 4.2$$

In this case, in equation 4.1, $\underline{x}(t) \in R^n$ represents a state vector of the dynamic model and $\dot{\underline{x}}$ represents a time derivative of $\underline{x}(t)$. $u(t) \in R^1$ represents an input variable and $y(t) \in R^1$ represents an output variable of the dynamic model.

A represents a system matrix which characterizes the dynamic behavior of the dynamic model, $\underline{b}$ represents an input vector of the system, $\underline{c}$ represents an output vector and y represents an output variable of the corresponding system, or of the dynamic model.

The dynamic model of the mobile platform may in particular be a dynamic model for transverse dynamics of the mobile platform, which is characterized in explicit form by equations 4.3 and 4.4.

$$\begin{bmatrix} \dot{\beta} \\ \dot{\psi} \\ \ddot{\psi} \\ \dot{y}_L \\ \dot{\delta} \end{bmatrix} = \begin{bmatrix} \frac{-c_v - c_h}{m \cdot v} & -1 - \frac{c_v \cdot l_v - c_h \cdot l_h}{m \cdot v^2} & 0 & 0 & \frac{c_v}{m \cdot v} \\ \frac{c_h \cdot l_h - c_v \cdot l_v}{J_z} & \frac{-c_v \cdot l_v^2 - c_h \cdot l_h^2}{J_z \cdot v} & 0 & 0 & \frac{c_v \cdot l_v}{J_z} \\ 0 & 1 & 0 & 0 & 0 \\ v & 0 & v & 0 & 0 \\ 0 & 0 & 0 & 0 & 0 \end{bmatrix} \cdot \begin{bmatrix} \beta \\ \dot{\psi} \\ \psi \\ y_L \\ \delta \end{bmatrix} + \begin{bmatrix} 0 \\ 0 \\ 0 \\ 0 \\ 1 \end{bmatrix} \cdot \dot{\delta}_u \qquad 4.3$$

$$y = [0 \ 0 \ 0 \ 1 \ 0] \cdot \begin{bmatrix} \beta \\ \dot{\psi} \\ \psi \\ y_L \\ \delta \end{bmatrix} \qquad 4.4$$

Equations 4.3 and 4.4 for the model of the transverse dynamics of the mobile platform are based on an extended linearized single-track model, wherein the model of the transverse dynamics, in addition to a standard single-track model with the state variables: slip angle ($\beta$) and yaw rate $d/dt\psi(t)$, corresponding to equations 4.3 and 4.4, is extended by the state variables: yaw angle $\psi(t)$, lateral offset $y_L M$ and steering angle $\delta(t)$.

In order to describe the model of the transverse dynamics, in this example method for generating a lateral offset trajectory, in place of a steering angle $\delta(t)$, a steering angle rate $\dot{\delta}_u(t)$ may be selected as a manipulated variable. For example, in the model, the steering angle $\delta(t)$ describes a state of the system and the steering angle rate $\dot{\delta}_u(t)$ characterizes a manipulated variable for the system.

The parameters in the matrix A characterize: a cornering stiffness at the front $c_v$; a cornering stiffness at the rear $c_h$; a mass of the mobile platform m; a vehicle speed v; a distance $l_h$ of the center of gravity of the mobile platform from its rear axle; a distance $l_v$ of a center of gravity of the mobile platform from its front axle $l_v$; and a mass inertia moment $J_z$ of the mobile platform in relation to a vertical axis.

An inversion of the dynamic model of the mobile platform can be used to directly calculate an input variable profile of the non-inverted model, such as a steering angle rate $\dot{\delta}_{u(t)}$, from a predetermined output variable profile of the non-inverted model, such as a time dependence of the lateral offset $y_L(t)$.

To invert the dynamic model 4.1 and 4.2, the latter can first be converted by means of the transformation rules 4.5 to 4.8 into a linear control normal form or in (differentially) flat coordinates $\underline{z}$ in accordance with equations 4.9 and 4.10. For the model of the transverse dynamics corresponding to equations 4.3 and 4.4, the equation system of equations 4.11 and 4.12 results therefrom.

$$\underline{z} = T \cdot \underline{x} \qquad 4.5$$

$$A_R = T \cdot A \cdot T^{-1} \qquad 4.6$$

$$\underline{b}_R = T \cdot b \qquad 4.7$$

$$\underline{c}_R^T = \underline{c}^T \cdot T^{-1} \qquad 4.8$$

Equations 4.1 and 4.2 transformed into flat coordinates can be written according to the following equations 4.9 and 4.10.

$$\dot{\underline{z}} = A_R \cdot \underline{z} + \underline{b}_R \cdot u \qquad 4.9$$

$$y = \underline{c}_R^T \cdot \underline{z} \qquad 4.10$$

Here, the variable z represents a variable for the (flat) output of the dynamic model of the transverse dynamics.

The transformation matrix T (4.5b, 4.5a) is used for a transformation of the states described in the original coordinates $\underline{x}$ in flat coordinates $\underline{z}$. The matrix $A_R$ characterizes the system of the dynamic model in flat coordinates or in the control normal form; $\underline{b}_R$ describes an input vector of the transformed system, $\underline{c}_R$ describes an output vector and y describes an output variable and u describes an input variable of the corresponding dynamic model in flat coordinates.

$$t^T = [0, 0, \ldots, 0, \beta] \cdot Q_S^{-1} \qquad 4.5a$$

$$T = [t, A^T \cdot t, \ldots, (A^T)^{n-1} \cdot t]^T \qquad 4.5b$$

In this case, $Q_S$ is the controllability matrix, and ß is a scaling factor and t is a ß-multiple of the last line of the inverted controllability matrix.

$$\begin{bmatrix} \dot{z} \\ \ddot{z} \\ \dddot{z} \\ z^{(4)} \\ z^{(5)} \end{bmatrix} = \begin{bmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ -a_0 & -a_1 & -a_2 & -a_3 & -a_4 \end{bmatrix} \begin{bmatrix} z \\ \dot{z} \\ \ddot{z} \\ \dddot{z} \\ z^{(4)} \end{bmatrix} + \begin{bmatrix} 0 \\ 0 \\ 0 \\ 0 \\ 1 \end{bmatrix} \cdot \dot{\delta}_u \qquad 4.11$$

$$y = [c_{R,1} \; c_{R,2} \; c_{R,3} \; c_{R,4} \; c_{R,5}] \cdot \begin{bmatrix} z \\ \dot{z} \\ \ddot{z} \\ \dddot{z} \\ z^{(4)} \end{bmatrix} \qquad 4.12$$

In this case, $z^{(x)}$ is an (x)-fold time derivative of z(t).

In the case of the selected parameterization according to equation 4.3 of the model of the transverse dynamics of the mobile platform, a number of elements $A_R$ and $\underline{c}_R^T$ according to the equations 4.13 and 4.14 result in 0, whereby the complexity for the solution of the equation system is markedly reduced.

$$a_0 = a_1 = a_2 = 0 \qquad 4.13$$

$$c_{R,4} = c_{R,5} = 0 \qquad 4.14$$

In this way, the last line of the extended single-track model of the transverse dynamics of the mobile platform is simplified to 4.15, which can be inverted in flat coordinates z according to equation 4.16.

$$z^{*(5)} = -a_3 \cdot \dddot{z}^* - a_4 \cdot z^{*(4)} + \dot{\delta}_u^* \qquad 4.15$$

$$\Rightarrow \dot{\delta}_u^* = z^{*(5)} + a_3 \cdot \dddot{z}^* + a_4 \cdot z^{*(4)} \qquad 4.16$$

A profile of a target manipulated variable, such as the steering angle rate $\dot{\delta}t(t)$, can thus be calculated directly in accordance with equation 4.16 by means of the corresponding derivatives of the flat output z of the dynamic model.

In order to determine the time sequence of lateral offset trajectory points, the target lateral offset can be transformed in spatial coordinates $w_y$, corresponding to a reference variable, into a reference signal $w_z$ in flat coordinates. The corresponding conversion takes place by means of a filtering according to equation 4.10 and leads to filter equation 4.17.

$$w_y = \underline{c}_R^T \cdot \underline{w}_z = \underline{c}_R^T \cdot \begin{bmatrix} w_z \\ \dot{w}_z \\ \ddot{w}_z \\ \dddot{w}_z \\ w_z^{(4)} \end{bmatrix} = \qquad 4.17$$

$$c_{R,1} \cdot w_z + c_{R,2} \cdot \dot{w}_z + c_{R,3} \cdot \ddot{w}_z \Rightarrow \ddot{w}_z = \frac{w_y - c_{R,1} \cdot w_z - c_{R,2} \cdot \dot{w}_z}{c_{R,3}}$$

For a generation of the lateral offset trajectory that can be carried out online, a target lateral offset trajectory $w_y(t)$ can be predefined, which is then transformed according to filter equation 4.17.

In particular, for a generation of the lateral offset trajectory that can be carried out online, a target lateral offset with, for example, a target lateral offset value $w_y$ and a target time $t_{end}$ can be specified which is then transformed in accordance with filter equation 4.17.

For the online trajectory planning, the time sequence of lateral offset trajectory points for the inverted dynamic model according to pilot control equation 4.16 is determined by the n-fold time differentiation of the target lateral offset $w_z$ from the filter 4.17 using the state variable filter.

To this end, a state variable filter with an order (n=5) of the extended single-track model 4.3 and 4.4 can be used in flat coordinates, which can be described by equation 4.18.

In other words: The state variable filter plans the time sequence of lateral offset trajectory points for the inverted extended single-track model.

Therefore, the state variable filter has the identical system order, in the case considered n=5, to the assumed route or vehicle model. In addition, no further model variables/information from the single-track model enter into the unlimited state variable filter according to 4.18.

Corresponding to $\dot{\underline{z}}^* + A_F \cdot \underline{z}^* + a_{F,0} \cdot w_z$, the following results:

$$\begin{bmatrix} z^{*(1)} \\ z^{*(2)} \\ z^{*(3)} \\ z^{*(4)} \\ z^{*(5)} \end{bmatrix} = \begin{bmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ -a_{F,0} & -a_{F,1} & -a_{F,2} & -a_{F,3} & -a_{F,4} \end{bmatrix} \cdot \begin{bmatrix} z^* \\ z^{*(1)} \\ z^{*(2)} \\ z^{*(3)} \\ z^{*(4)} \end{bmatrix} + a_{F,0} \cdot w_z \quad 4.18$$

A specification for a desired dynamics for the trajectory planning by means of the state variable filter can take place by means of a corresponding design of the filter coefficients $(a_{F,0}, \ldots, a_{F,4})$, for example according to the related art by means of a pole specification or by designing a linear-quadratic regulator (LQR), taking into account the route dynamics, i.e. the mobile platform and the assumed system limits.

With the specification of desired dynamics for the state variable filter, the generated lateral offset trajectory can be adapted to the behavior of the mobile platform.

In other words, for online trajectory planning, with specification of a target lateral offset $w_y(t)$ or $w_z(t)$, the trajectory profile $z^*(t)$ for the inverted flatness-based dynamic model, according to the flat output of the dynamic model, and the time derivatives thereof:

$$z^{*(1)}, \ldots, z^{*(5)}; \underline{z}^* = [z^*, z^{*(1)}, z^{*(2)}, z^{*(3)}, z^{*(4)}] \quad 40$$

is calculated in order to determine the time sequence of lateral offset trajectory points, which then serve as an input variable for the inverse model for calculating the manipulated variable profile, in order to calculate a target manipulated variable profile $\delta^*(t)$ in accordance with equation 4.16.

The determination of a time sequence of lateral offset trajectory points for the inverted dynamic model can take place based on a state system variable restriction, such as a limit of the yaw rate, by means of polytopical state limits, as illustrated in the following, and can thus be an integral component of the trajectory planning.

Such an set of k polytopical state limits according to equation 4.19:

$$c_{x,k}(x) := f_{x,k}^T \cdot x - g_{x,k} \leq 0, \, k = 1, \ldots, n_c \quad 55$$

$$F_x \cdot \underline{x}(t) - \underline{g}_x \leq 0 \quad 4.19$$

describes a limit by boundary surfaces (hyperplanes) in the state space. In this case, the set of all state vectors is given exactly on a boundary surface by $\{\underline{x} | F_x \cdot \underline{x} = \underline{g}_x\}$.

And $F_x$ is a matrix that defines a linear combination of states which is limited; $\underline{x}(t)$ is the state vector in original coordinates; and the vector $\underline{g}_x$ indicates the values of the relevant limit.

In the case of the yaw rate limitation considered here, the polytopical state limits are reduced to a box-state limit according to equations 4.20 and 4.21 and $g_{x,\dot{\psi}}$ directly represents the limit value of the state $\dot{\psi}$.

$$f_{x,\dot{\psi}}^T \cdot \underline{x}(t) - g_{x,\dot{\psi}} \leq 0 \quad 4.20$$

$$f_{x,\dot{\psi}}^T = [0\,1\,0\,0\,0] \quad 4.21$$

The limits can be converted by applying the transformation rule into flat coordinates with the above-described transformation matrix T for a transformation into flat coordinates according to equations 4.22 and 4.23.

$$f_{z^*,\dot{\psi}}^T = [f_{z^*,1}, f_{z^*,2}, f_{z^*,3}, f_{z^*,4}, f_{z^*,5}] = f_{x,\dot{\psi}}^T \cdot T^{-1} \quad 4.22$$

$$g_{z^*,\dot{\psi}} = g_{x,\dot{\psi}} \quad 4.23$$

In the case of the selected parameterization of the system model 4.3, the transformation results in some elements of $\underline{f}_{z^*,\dot{\psi}}^T$ in accordance with 4.24 to 0.

$$f_{z^*,1} = f_{z^*,2} = f_{z^*,5} = 0 \quad 4.24$$

Consideration of the limit within the trajectory planning takes place via the limitation of the highest, i.e., the n-th derivative of its flat output $z^*$. In order to generate a dependence between the highest derivative $z^{*(5)}$ and the state limit, an approximation of the states $\underline{z}^*$ is carried out over a small time horizon $\Delta t$ by means of the Taylor series.

The necessary limitation of $z^{*(5)}$ can be calculated by equations 4.25 and 4.26 for the upper $g_{z^*,\dot{\psi}+}$ and lower $g_{z^*,\dot{\psi}-}$ limit of the yaw rate.

$$z^{(5)}_{\dot{\psi},max} = -\frac{\underline{f}_{z^*,\dot{\psi}}^T}{\left|\underline{f}_{z^*,\dot{\psi}}^T \cdot \underline{b}_p\right|} \cdot A_p \cdot \underline{z}^* + \frac{g_{z^*,\dot{\psi}+}}{\left|\underline{f}_{z^*,\dot{\psi}}^T \cdot \underline{b}_p\right|} \quad 4.25$$

$$z^{(5)}_{\dot{\psi},min} = \frac{\underline{f}_{z^*,\dot{\psi}}^T}{\left|\underline{f}_{z^*,\dot{\psi}}^T \cdot \underline{b}_p\right|} \cdot A_p \cdot \underline{z}^* - \frac{g_{z^*,\dot{\psi}+}}{\left|\underline{f}_{z^*,\dot{\psi}}^T \cdot \underline{b}_p\right|} \quad 4.26$$

In this regard, $A_p$ and $\underline{b}_p$ are given by equations 4.26b $$A_P = \begin{bmatrix} 1 & \frac{\Delta t^1}{1!} & \cdots & \frac{\Delta t^{(n-1)}}{(n-1)!} \\ & & & A \neq (n-2) \\ 0 & 1 & \cdots & \underline{b}_p = 1 \\ \vdots & & & \vdots \\ 0 & \cdots & 0 & 1 \end{bmatrix}, \quad 4.26b$$

$$b_P = \begin{bmatrix} \frac{\Delta t^n}{n!} \\ \frac{\Delta t^{n-1}}{(n-1)!} \\ \vdots \\ \frac{\Delta t^1}{1!} \end{bmatrix}$$

In order to ensure the feasibility of the evasion trajectory already in the trajectory planning, a manipulated variable limit can additionally be taken into account as a limit of a system variable in the determination of a time sequence of lateral offset trajectory points for the steering angle rate.

The limit of the steering angle rate as a manipulated variable of the system takes place according to equations 4.15, 4.27 and 4.28 through the calculation of the maximally permissible highest derivative of the flat output $z^*$ with the provided manipulated variable limit $\dot{\delta}_{max}$ and $\dot{\delta}_{min}$ in accordance with the last line of system equations 4.3 in flat coordinates.

$$z^{*(5)}_{\delta_u,max} = -a_3 \cdot \dddot{z}^* - a_4 \cdot z^{*(4)} + \dot{\delta}_u,max \quad 4.27$$

$$z^{*(5)}_{\delta_u,min} = -a_3 \cdot \dddot{z}^* - a_4 \cdot z^{*(4)} + \dot{\delta}_u,min \quad 4.28$$

In this method for generating the lateral offset trajectory, it is particularly advantageous that state and manipulated variable limitations can be taken into account as an integral component of the generation of the lateral offset trajectory.

As a result, it is possible to introduce a compliance with the above-described controllability limit values, for example a state variable limit, such as the yaw rate.

Accordingly, the consideration of the limits of a state variable and/or of a manipulated variable within the trajectory planning can take place by means of a limitation of the highest, that is to say n-th derivative of its flat output z*.

In accordance with the method according to the present invention, further state and manipulated variable limits can be realized.

The differential equation system 4.18 can then be solved by a numerical integration, for example with a fixed step size, during the runtime in order to carry out the online trajectory planning, wherein, as described, the highest derivative of the flat output can be limited.

This means that the time sequence of lateral offset trajectory points for the inverted dynamic model can be regarded with a state variable filter based on the at least one limit of the system variable according to a switching system, because, using the designed limit functions 4.25, 4.26, 4.27 and 4.28, saturation links 4.29 can be parameterized (reference to FIG. 3 as an embodiment is advantageous):

$$z^{*(5)}_{\{lim\}}(t) = \begin{cases} z^{*(5)}_{min}(z^*(t)), & z^{*(5)}_D < z^{*(5)}_{min} \\ z^{*(5)}_D(z^*(t), w_z(t)), & z^{*(5)}_{min} \leq z^{*(5)}_D \leq z^{*(5)}_{max} \\ z^{*(5)}_{max}(z^*(t)), & z^{*(5)}_D > z^{*(5)}_{max} \end{cases} \quad 4.29$$

Here, $z_D^{*(5)}$, describes the unlimited desired dynamics of the time sequence of lateral offset trajectory points, which is connected with the limit functions 4.25, 4.26, 4.27 and 4.28 such that, in view of the assumed system limits, it results in an admissible, namely limited, trajectory profile $z_{\{lim\}}^{*(5)}(t)$.

For the selected limits of the manipulated and state variables, according to formula 4.29, a prioritization can be freely selected and their sequence can be implemented via a series connection of saturation links. This prioritization offers the advantage that, if the compliance with a limit becomes physically impossible, the limit with the next lower priority is automatically used to nevertheless provide a solution.

According to one aspect of the present invention, it is provided that the respective points of the time sequence of the lateral offset trajectories be determined and/or calculated analytically by means of the numerical online solution of a differential equation and/or a differential equation system.

According to one aspect of the present invention, it is provided that the state variable filter has predetermined target dynamics and, in particular the predetermined target dynamics are characterized by an extended single-track model of the mobile platform.

An advantage of specifying target dynamics is that the desired dynamic behavior of the system can be parameterized and specified.

The extended single-track model can be used to take into account all relevant states of the system. In this case, the single-track model is extended, inter alia, by the state 'lateral offset,' since a trajectory of the lateral offset is planned for the evasion maneuver.

According to one aspect of the present invention, it is provided that the dynamic model of the mobile platform is transformed into flat coordinates; and in particular the system of the state variable filter and the system of the dynamic model have an identical system order.

The limited state variable filter can be described by equations 4.18 and 4.29.

According to one aspect of the present invention, it is provided that the respective points of the time sequence of the lateral offset trajectories are determined analytically using a numerical solution, a differential equation.

Advantageously, a lateral offset trajectory and, in particular, a time sequence of lateral offset trajectory points can be determined by the numerical solution, i.e. by an online integration of the differential equation system with, in comparison to optimization solutions, little computation effort in a short time.

According to one aspect of the present invention, it is provided that the at least one system variable of the dynamic flatness-based model is limited by means of a polytopical state limit of the at least one system variable of the state variable filter. Advantageously, with polytopical state limits, not only box constraints, i.e. $x < x_{max}$, are taken into account, but an arbitrary linear combination of states can thus be limited; for example, position-dependent speed limits can thus be mapped or taken into account.

In accordance with one aspect of the present invention, it is provided that unlimited desired dynamics are characterized by the time sequence of lateral offset trajectory points, and are predefined by means of filter coefficients $(a_{F,0}, \ldots, a_{F,4})$ of the state variable filter by means of a pole specification and/or by designing a linear-quadratic regulator.

In particular, the desired dynamics can take into account, for example, route dynamics of a mobile platform, such as a vehicle. That is to say, the pole/time constants are selected manually and/or with the aid of the aforementioned design methods such that the planned trajectory has, in unlimited fashion, the desired dynamics.

By explicitly taking into account the limits of a system variable, in the method for generating a lateral offset trajectory, the desired dynamics can be set significantly more highly dynamically, since these are limited downstream, taking into account the limits, and thus feasibility is ensured.

According to one aspect of the present invention, it is provided that the target lateral offset defines a target lateral offset value within a defined time interval.

According to one aspect of the present invention, it is provided that the at least one limit of a system variable of the flatness-based dynamic model relates to at least one limit of a manipulated variable and/or at least one limit of a state variable of the flatness-based dynamic model. The advantages of the method designed in this way have already been explained above.

According to one aspect of the present invention, it is provided that the state variable filter is limited depending on a prioritizing sequence, based on a limit of a manipulated variable of the dynamic model, and/or based on a limit of a state variable of the dynamic model.

In other words, the selected limits of the manipulated and state variables can be freely selected according to a prioritization and their sequence can be implemented via a series connection of saturation links. This prioritization offers the advantage that, if the compliance with a prioritized limit becomes physically impossible, the limit with the next lower priority is automatically limited to nevertheless provide a solution.

According to one aspect of the present invention, it is provided that the at least one limited manipulated variable of the flatness-based dynamic model is a manipulated variable and/or a gradient of the manipulated variable and/or an acceleration of the manipulated variable of at least one actuator which influences lateral dynamics of the mobile platform. As a result, the method can be adapted to different requirements for control and/or regulation or operation of the mobile platform.

According to one aspect of the present invention, it is provided that the at least one actuator controls a steering angle and/or at least one brake pressure and/or at least one wheel damper. By controlling different actuators, an adaptation to a type of the mobile platform or to certain dynamic behaviors of the mobile platform can be made.

According to one aspect of the present invention, it is provided that the at least one limit of the state variable of the dynamic model is a sideslip angle and/or a yaw angle and/or a yaw rate and/or a transverse acceleration and/or a steering angle and/or a lateral offset of the mobile platform.

The method can thus be adapted to the different requirements for controlling and/or regulating dynamics of a mobile platform.

According to an example embodiment of the present invention, a method is provided in which, based on a time sequence of values of at least one manipulated variable, a control signal for controlling an at least partially automated vehicle is provided; and/or, based on the time sequence of values of at least one manipulated variable, a warning signal is provided for warning a vehicle occupant.

With such a control and/or warning signal, a higher level of safety can be achieved in the case of an at least partially automated mobile platform.

The term "based on" is to be broadly understood with respect to the feature that a control signal is provided based on a time sequence of values of at least one manipulated variable. It is to be understood in such a way that the time sequence of values of at least one manipulated variable is used for any determination or calculation of a control signal, which does not exclude other input variables also being used for this determination of the control signal. This applies accordingly to the provision of a warning signal.

According to an example embodiment of the present invention, a use of the method described above for avoiding accidents in road traffic is provided.

According to an example embodiment of the present invention, a control device is provided which is configured to carry out one of the above-described methods for generating a lateral offset trajectory for an at least partially automated mobile platform.

According to one aspect of the present invention, a computer program is provided which comprises instructions which, when the computer program is executed by a computer, cause the computer to carry out one of the methods described above. Such a computer program enables the use of the described method in different systems.

A machine-readable storage medium is specified on which the above-described computer program is stored. The computer program described above is transportable by means of such a machine-readable storage medium.

A mobile platform can be understood to be an at least partially automated system which is mobile, and/or a driver assistance system. An example can be an at least partially automated vehicle or a vehicle with a driver assistance system. That is, in this context, an at least partially automated system includes a mobile platform with respect to at least partially automated functionality, but a mobile platform also includes vehicles and other mobile machines including driver assistance systems. Further examples of mobile platforms can be driver assistance systems with a plurality of sensors or mobile multi-sensor robots.

BRIEF DESCRIPTION OF THE DRAWINGS

Exemplary embodiments of the invention are illustrated with reference to FIG. 1 and explained in more detail below. In the drawings.

DETAILED DESCRIPTION OF EXAMPLE EMBODIMENTS

Figure 1:
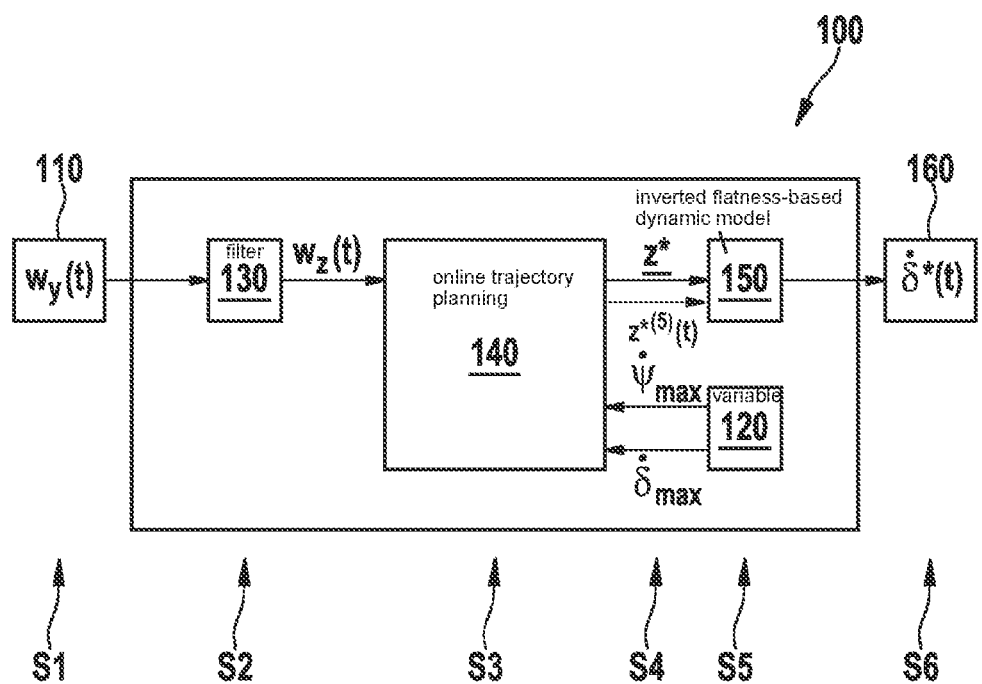
FIG. 1 shows a data flow diagram of a method for generating a lateral offset trajectory, according to an example embodiment of the present invention.

FIG. 1 schematically shows a flow diagram of the method 100 for generating a lateral offset trajectory 620 for an at least partially automated mobile platform. In step S1, the method is provided with a target lateral offset $w_y(t)$ 110. In step S2, the target lateral offset $w_y(t)$ 110 is transformed into flat coordinates $w_z(t)$ using the filter 130. For an online trajectory planning 140, the state variable 142 of the online trajectory planning 140 is provided with the target lateral offset in flat coordinates $w_z(t)$, and, in step S4, with a limit of a manipulated variable 120 $\delta_{u,max}$ and a limit of a state variable 120 $\psi_{max}$ as input variables. In addition, in step S3 a time sequence of lateral offset trajectory points $z^*(t_n)$ and the fifth time derivative $z^{5*}(t)$ are determined as input variables for the inverted flatness-based dynamic model 150 for the determination of the time sequence of lateral offset trajectory points and provided to the inverted dynamic model in step S5. By means of the time sequence of lateral offset trajectory points $z^*(t_n)$ and the fifth time derivative $z^{5*}(t)$ a time sequence of values of at least one manipulated variable $\delta_u^*(t)$ 160 of the mobile platform is determined by the inverted flatness-based dynamic model 150 in step S6. The time sequence of values 160 of at least one manipulated variable $\delta_u^*(t)$ 160 of the mobile platform can be used for pilot control for a trajectory control of the mobile platform.

Figure 2:
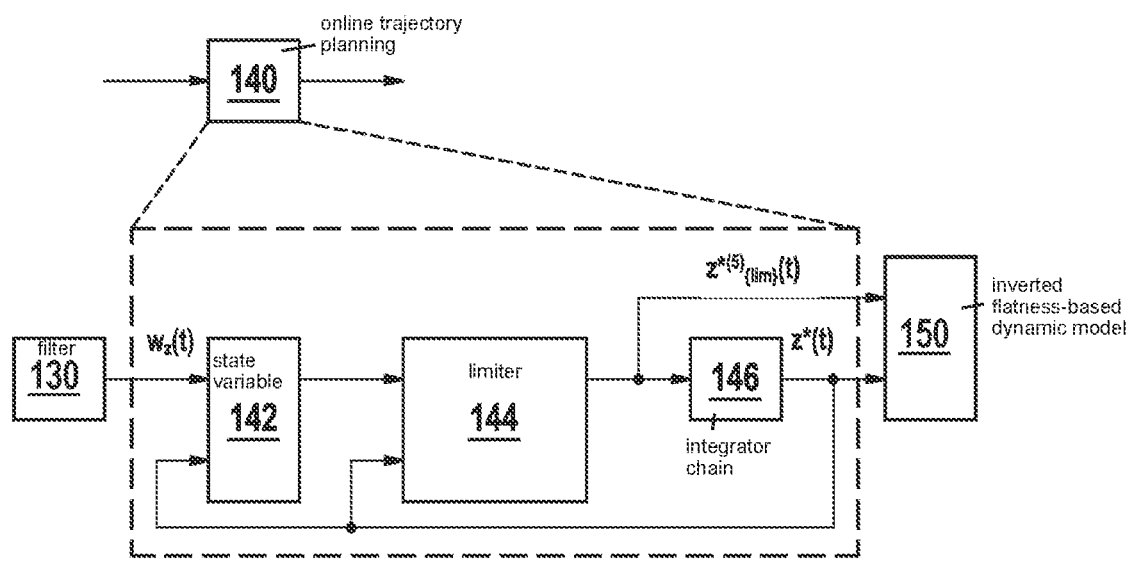
FIG. 2 shows a data flow diagram of the online trajectory planning with the limited state variable filter, according to an example embodiment of the present invention.

FIG. 2 schematically illustrates the information flows of the online trajectory planning 140 of FIG. 1 in flat coordinates, wherein the online trajectory planning 140 has a limiter 144 and an integrator chain 146 according to an extended, switching state variable filter 140 with unlimited filter desired dynamics 142.

In this case, from the target lateral offset in flat coordinates $w_z(t)$ 130, an unlimited desired signal for the highest time derivative of the flat output $z^{n*}(t)$ of the dynamic model is determined by means of the predetermined desired dynamics of the state variable filter 142, which time derivative is limited by the limiter 144 and is integrated by the integrator chain 146, from which trajectories $z^*$ and $z^{*(1)}, \ldots, z^{*(n)}$ and n time derivatives thereof result, in order to provide a time sequence of lateral offset trajectory points as an input variable for the inverse flatness-based dynamic model of the mobile platform 150. In this case, this input variable is coupled back into the limiter 144 and into the dynamics of the state variable filter 142 for the next calculation step. The output signal of the online trajectory planning 140 is provided to the inverse flatness-based dynamic model 150, for example for calculating the pilot control $\delta(t)$. In this method, the system variable is dynamically limited according to the limit functions 4.25, 4.26, 4.27 and 4.28, i.e. the dynamics of the filter are limited in a time-variant manner.

Figure 3:
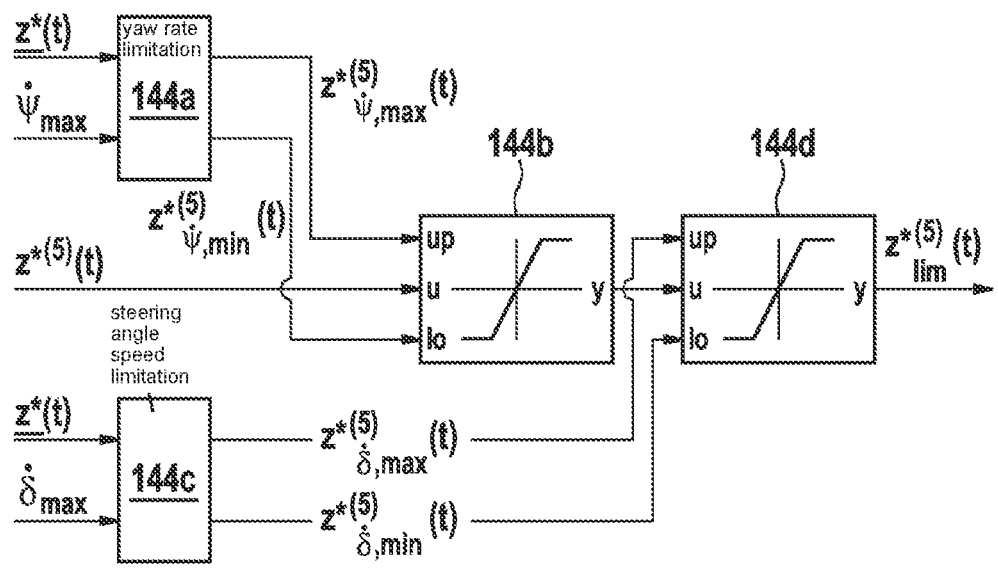
FIG. 3 shows a cascade of two saturation elements for the prioritization-based consideration of state and manipulated variable limits within the trajectory plan, according to an example embodiment of the present invention.

FIG. 3 schematically illustrates a data flow of a prioritization of the limit of a state variable and/or a manipulated variable by means of a first saturation filter 144b and a second saturation filter 144d connected behind it in series, wherein the first saturation filter 144b can limit a state variable, such as a yaw rate, and the second saturation filter 144d arranged in the information flow direction behind the first saturation filter 144b can limit a manipulated variable, such as a steering angle speed, in order to limit an input variable, namely a fifth derivative of z, only by means of the first saturation filter 144b and/or by means of the second saturation filter 144d. In this case, the yaw rate limitation 144a is provided with both a limit of the yaw rate and the trajectory profile of the flat output $z^*(t)$ of the dynamic model, as well as its time derivatives, or the filter states of equation 4.18. The steering angle speed limitation 144c is provided with both a limit of the steering angle speed and of the trajectories profile of the flat output $z^*(t)$ of the dynamic model of the dynamic model, as well as the time derivatives thereof. Thus, a prioritization of the limit can be achieved by a cascading sequence of the two limiters.

Figure 4:
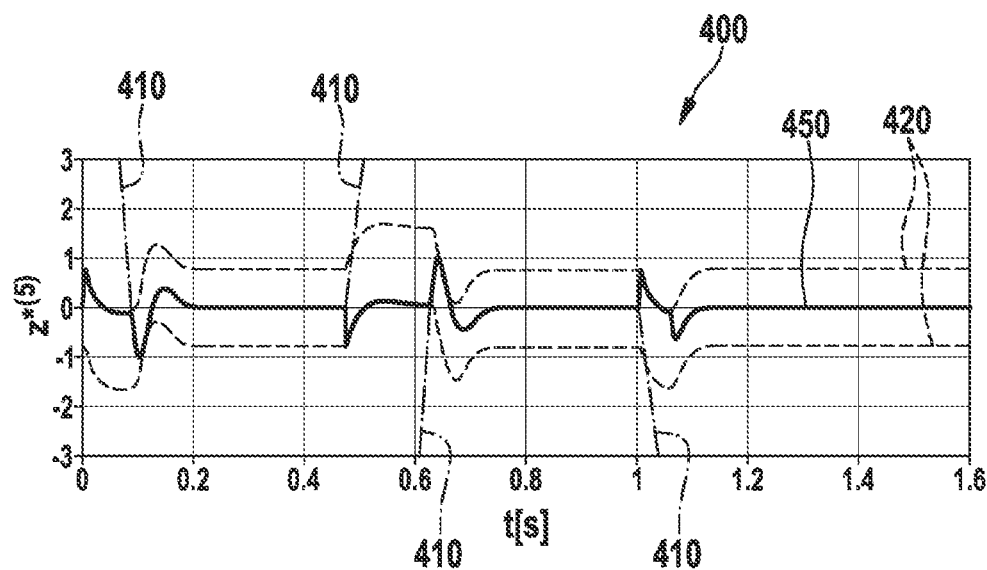
FIG. 4 shows a time profile of the limited highest derivative of the flat output of the dynamic model, according to an example embodiment of the present invention.

FIG. 4 shows a diagram 400 in which the fifth derivative of the trajectory profile of the flat output z is plotted against the time t with the curve 450. The limitation of the fifth derivative is outlined by the profile of the curve of a limit by the state variable 410 and by the profile of the curve of a limit by the manipulated variable 420. It can be seen here that the fifth derivative is determined within the upper and lower limit of the manipulated variable 420 by the maximum utilization of the state variable 410.

Figure 5A:
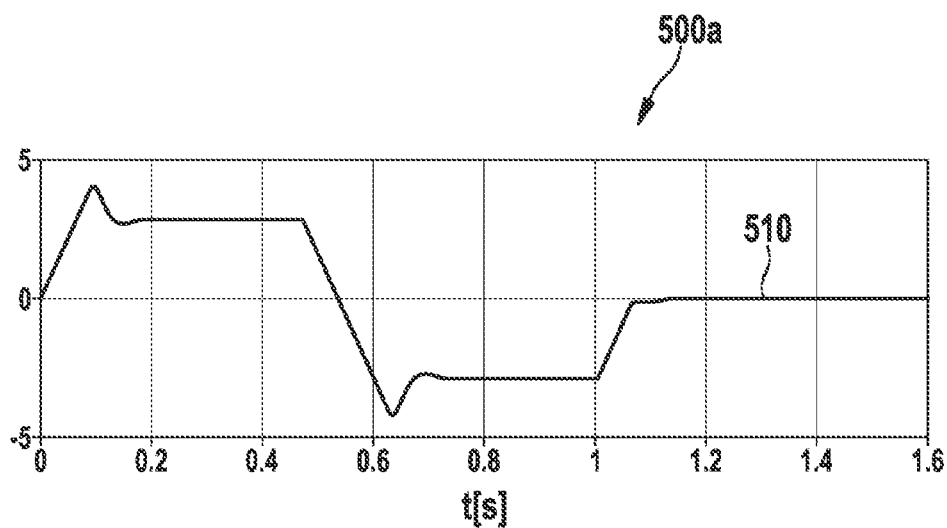
FIGS. 5A, 5B show a time profile of the steering angle and the limited steering angle rate.

FIG. 5A illustrates an example of a profile of the manipulated variable of the steering angle 510 over time in the diagram 500a.

Figure 5B:
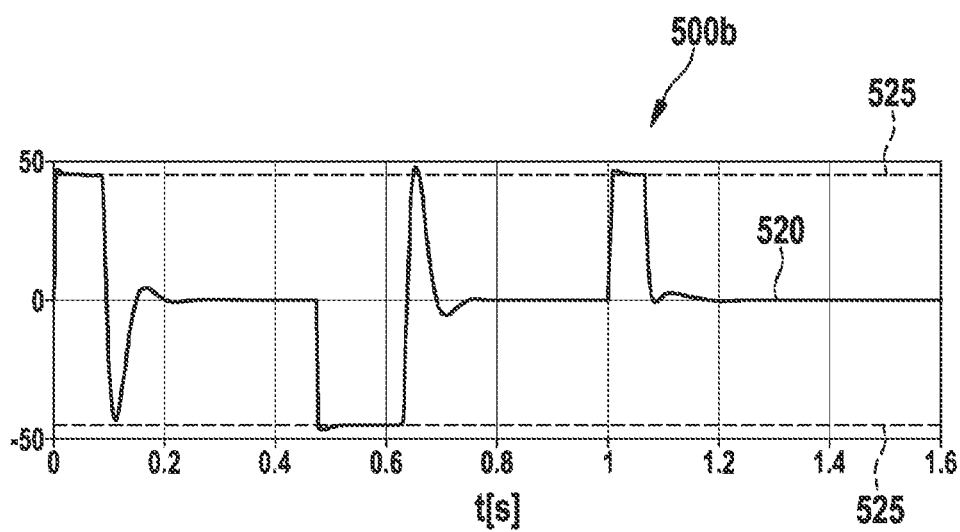

And FIG. 5B illustrates the corresponding profile of the steering angle rate 520 with the upper and lower limits 525 in the diagram 500b.

Figure 6A:
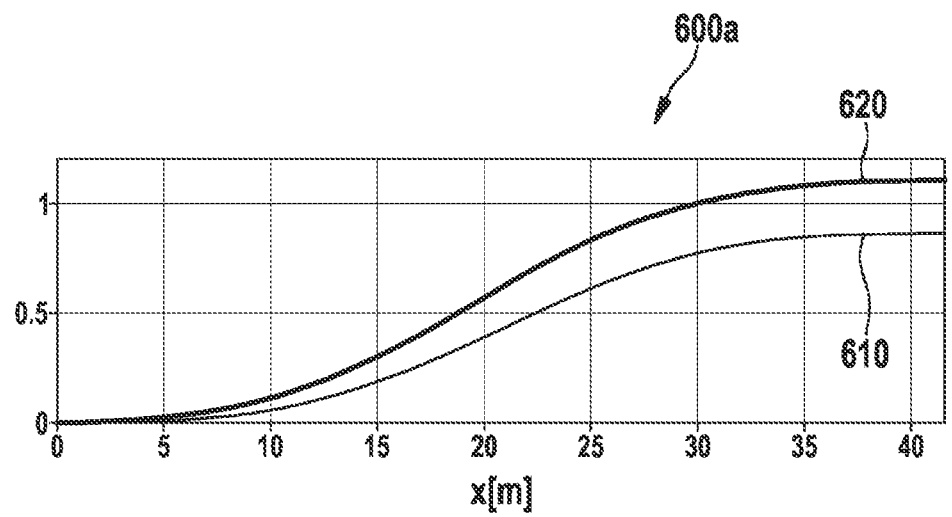
FIG. 6A shows a comparison of evasion trajectories.

FIG. 6A compares a lateral offset trajectory 620 generated with this method with a differently generated lateral offset trajectory 610 in the diagram 600a, wherein the latter was generated according to the related art, without maximized use of a state limit for determining the trajectory. The lateral offset y of the mobile platform is plotted in the diagram 600a within the same distance x and it can be seen that an increase in the lateral offset by about 20% can be realized with the new method.

Figure 6B:
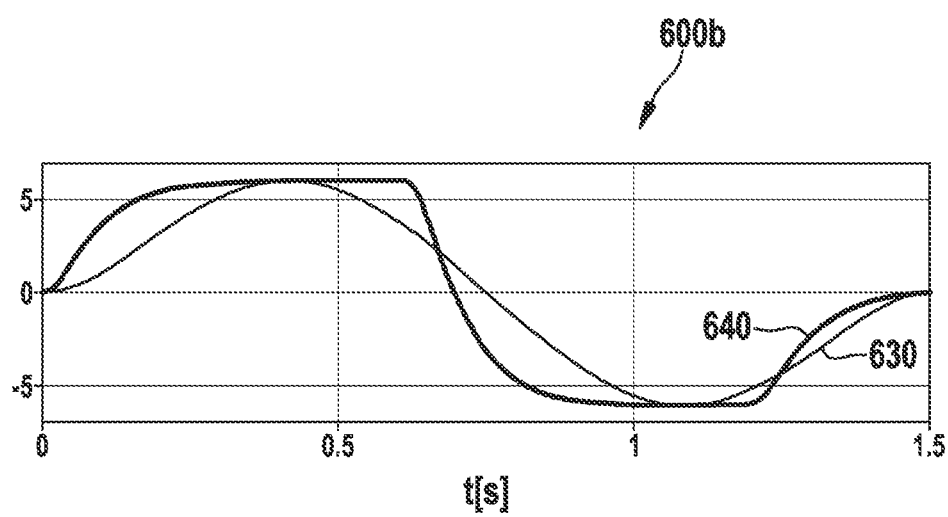
FIG. 6B shows a comparison of yaw rate profiles.

With the diagram 600b of FIG. 6B, in which the yaw rate is plotted against the time t both for the method 640 described here and according to the related art 630, it is illustrated that an improved profile of the trajectory can be achieved by utilization of the maximally possible yaw rate that is maximized within the time range of the trajectory according to the described method.

Figure 7:
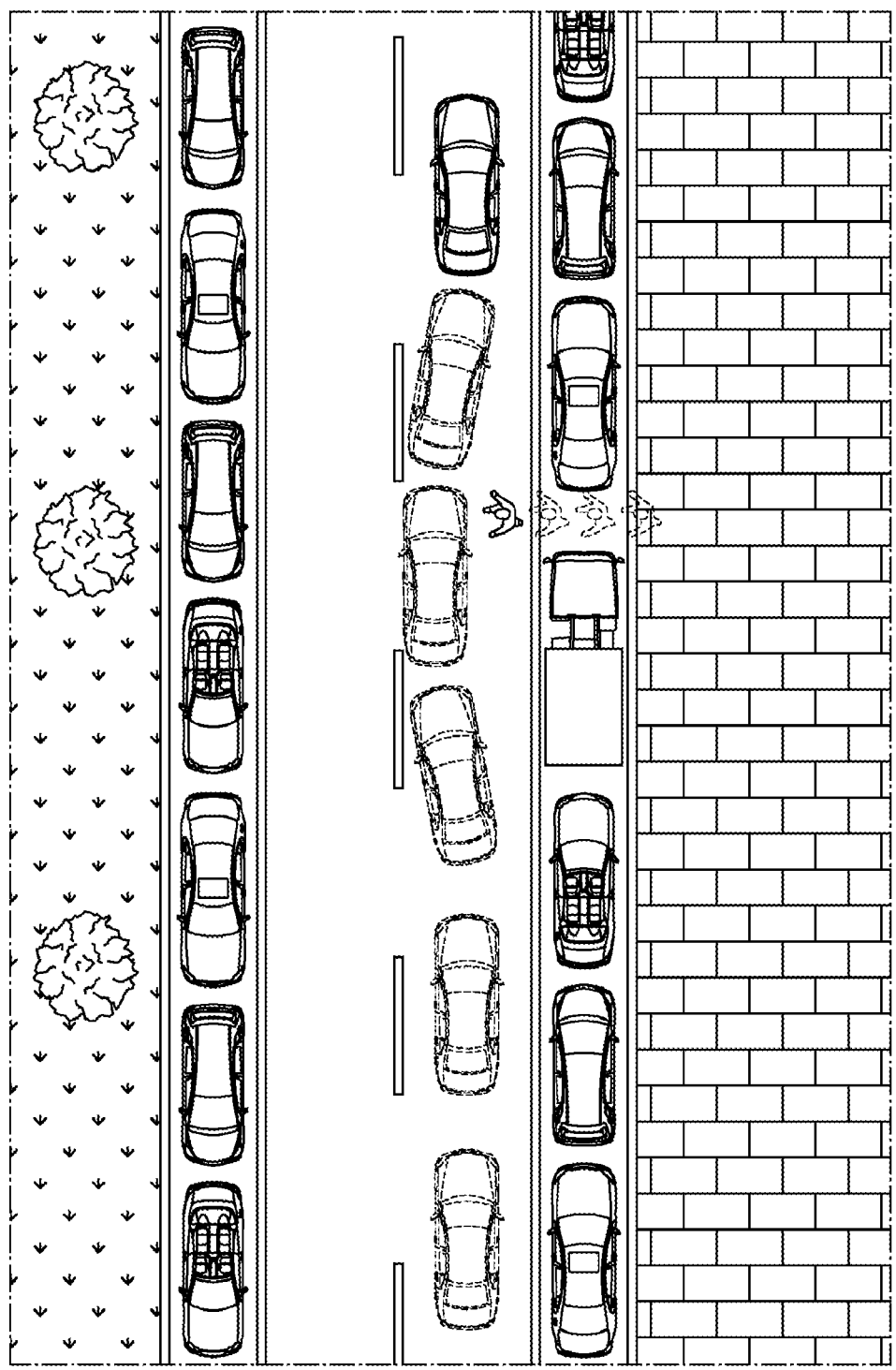
FIG. 7 shows a simulation of a scenario of an evasion function with a lateral offset trajectory.

FIG. 7 illustrates a traffic scenario with a simulation of an evasion function with a lateral offset trajectory which is triggered by a person on the road.

What is claimed is:

1. A method for an at least partially automated mobile platform, the method comprising the following steps:
   transforming a target lateral offset into sets of flat coordinates, each set corresponding to a respective one of a plurality of moments in time and being a respective set of values for each of a predefined set of state parameters, the values of the set thereby representing a state into which the mobile platform is targeted to be placed at the respective moment in time, wherein:
   the plurality of moments in time form a period in which the mobile platform is to achieve the desired lateral offset;
   the sets of flat coordinates form a continuous sequence representing a smooth trajectory over the period;
   the transformation is performed under a filter (I) that smooths physical transitions of the mobile platform following the trajectory over the period and (II) that applies predefined constraints with respect to a plurality of mobile platform state limitations and a plurality of mobile platform control constraints, the sequence of the sets of flat coordinates thereby being a smoothed and constrained trajectory; and
   the transformation, with respect to each of the plurality of moments in time respectively, is performed analytically without an iterative optimization; and
   performing control signal generation by inputting the continuous sequence of the sets of flat coordinates into an inverted dynamic model that directly converts the input sequence into corresponding input control signals that are used for achieving the respective sequence of states represented by the sequence of flat coordinates, causing the mobile platform to follow the smoothed and constrained trajectory.

2. The method according to claim 1, wherein the filter has predetermined target dynamics, and the predetermined target dynamics are characterized by an extended single-track model of the mobile platform.

3. The method according to claim 1, wherein the transformation into the sets of flat coordinates is performed from a representation of the target lateral offset in a dynamic model of the mobile platform, and a system of the filter and a system of the dynamic model have an identical system order.

4. The method according to claim 1, wherein the analytically performed transformation uses a numerical solution of a differential equation.

5. The method according to claim 1, wherein the predefined constraints include at least one polytopical state limit applied by the filter for analytically determining one of more of the sets of flat coordinates satisfy the polytopical state limit without iterative optimization.

6. The method according to claim 1, wherein:
   the transformation into the sets of flat coordinates is performed from a representation of the target lateral offset in a dynamic model of the mobile platform; and
   the filter is limited depending on a prioritizing sequence based on a limit of one or more controls by which to manipulate one or more variables of the dynamic model, and/or based on a limit of states of the mobile platform represented in the dynamic model.

7. The method according to claim 1, wherein the control constraint is of a manipulated variable and/or a gradient of the manipulated variable and/or an acceleration of the manipulated variable of at least one actuator which influences lateral dynamics of the mobile platform.

8. The method according to claim 7, wherein the at least one actuator controls a steering angle and/or at least one brake pressure and/or at least one wheel damper.

9. The method according to claim 1, wherein the state limitations include at least one limit of a slip angle and/or a yaw angle and/or a yaw rate and/or a lateral acceleration and/or a steering angle and/or a lateral offset of the mobile platform.

10. The method according to claim 1, wherein the input control signals represent a time sequence of values of at least one manipulated variable used to control the at least partially automated mobile platform, the at least partially automated mobile platform being a vehicle.

11. The method according to claim 1, wherein the input control signals represent a time sequence of values of at least one manipulated variable and are used to issue a warning signal for warning an occupant of the at least partially automated mobile platform, the at least partially automated mobile platform being a vehicle.

12. The method according to claim 1, wherein the input control signals represent a time sequence of values of at least one manipulated variable used for avoiding accidents in road traffic.

13. The method of claim 1, wherein the filter comprises a predetermined set of filter coefficients to determine the sets of flat coordinates.

14. The method of claim 1, wherein the transformation uses a transformation matrix T to transform from a state-space representation of the mobile platform model to a flat coordinate representation.

15. The method of claim 14, wherein the transformation matrix T is defined according to $t^T=[0, 0, \ldots, 0, \beta] \cdot Q_S^{-1}$ and $T=[t, A^T \cdot t, \ldots, (A^T)^{n-1} \cdot t]^T$, wherein t is a row vector, ß is a scaling factor, Qs is a controllability matrix, A is a system matrix that represents a dynamic model of the platform.

16. The method of claim 1, wherein the flat coordinates comprise at least a lateral offset and a yaw rate of the mobile platform.

17. The method of claim 1, wherein the predefined set of state parameters includes slip angle, yaw rate, yaw angle, and steering angle of the mobile platform.

18. The method of claim 1, wherein states to which the set of flat coordinates correspond are represented by a state vector and include cornering stiffness, platform velocity, platform mass, axle to center of gravity distance, and yaw inertia moment.

19. The method of claim 1, wherein the smoothing comprises filtering high-frequency components from the time sequence of the sets of flat coordinates.

20. The method of claim 1, wherein the mobile platform state limitations include at least one limit on yaw rate.

21. The method of claim 20, wherein the yaw rate limit is applied by a determination of a maximum permissible value of a fifth derivative.

22. The method of claim 1, wherein the control constraints include at least one limit on steering angle rate.

23. The method of claim 22, wherein the limit on steering angle rate is obtained by a determination of a fifth derivative.

24. The method of claim 1, wherein the transforming is performed by passing through an n-fold integrator chain, n representing a system order of a dynamic model of how states of the mobile platform change over time in response to control inputs.

25. The method of claim 24, wherein the method further comprises inverting the dynamic model to generate the inverted dynamic model, the inverted dynamic model representing which control inputs correspond to changes in the states of the mobile platform.

26. A control device for an at least partially automated mobile platform, the control device comprising a processor, the processor being configured to:
   transform a target lateral offset into sets of flat coordinates, each set corresponding to a respective one of a plurality of moments in time and being a respective set of values for each of a predefined set of state parameters, the values of the set thereby representing a state into which the mobile platform is targeted to be placed at the respective moment in time, wherein:
     the plurality of moments in time form a period in which the mobile platform is to achieve the desired lateral offset;
     the sets of flat coordinates form a continuous sequence representing a smooth trajectory over the period;
     the transformation is performed under a filter (I) that smooths physical transitions of the mobile platform following the trajectory over the period and (II) that applies predefined constraints with respect to a plurality of mobile platform state limitations and a plurality of mobile platform control constraints, the sequence of the sets of flat coordinates thereby being a smoothed and constrained trajectory; and
     the transformation, with respect to each of the plurality of moments in time respectively, is performed analytically without an iterative optimization; and
   perform control signal generation by inputting the continuous sequence of the sets of flat coordinates into an inverted dynamic model that directly converts the input sequence into corresponding input control signals that are used for achieving the respective sequence of states represented by the sequence of flat coordinates, causing the mobile platform to follow the smoothed and constrained trajectory.

27. A non-transitory machine-readable storage medium on which is stored a computer program that is executable by a computer and that, when executed by the computer, causes the computer to perform a method for an at least partially automated mobile platform, the method comprising the following steps:
   transforming a target lateral offset into sets of flat coordinates, each set corresponding to a respective one of a plurality of moments in time and being a respective set of values for each of a predefined set of state parameters, the values of the set thereby representing a state into which the mobile platform is targeted to be placed at the respective moment in time, wherein:
     the plurality of moments in time form a period in which the mobile platform is to achieve the desired lateral offset;
     the sets of flat coordinates form a continuous sequence representing a smooth trajectory over the period;
     the transformation is performed under a filter (I) that smooths physical transitions of the mobile platform following the trajectory over the period and (II) that applies predefined constraints with respect to a plurality of mobile platform state limitations and a plurality of mobile platform control constraints, the sequence of the sets of flat coordinates thereby being a smoothed and constrained trajectory; and the transformation, with respect to each of the plurality of moments in time respectively, is performed analytically without an iterative optimization; and performing control signal generation by inputting the continuous sequence of the sets of flat coordinates into an inverted dynamic model that directly converts the input sequence into corresponding input control signals that are used for achieving the respective sequence of states represented by the sequence of flat coordinates, causing the mobile platform to follow the smoothed and constrained trajectory.

\* \* \* \* \*